US012166650B2

(12) United States Patent
Labonte et al.

(10) Patent No.: US 12,166,650 B2
(45) Date of Patent: *Dec. 10, 2024

(54) SYSTEMS AND METHODS FOR TRACKING AND EXPORTING FLOWS IN SOFTWARE WITH AUGMENTED PROCESSING IN HARDWARE (71) Applicant: Arista Networks, Inc., Santa Clara, CA (US)

(72) Inventors: Francois Labonte, Menlo Park, CA (US); Jeevan Kamisetty, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,921

(22) Filed: Mar. 17, 2023

(65) Prior Publication Data

US 2023/0318948 A1 Oct. 5, 2023

Related U.S. Application Data

(63) Continuation of application No. 17/314,451, filed on May 7, 2021, now Pat. No. 11,611,494.

(51) Int. Cl.
*H04L 43/062* (2022.01)
*H04L 47/2483* (2022.01)
(52) U.S. Cl.
CPC ........ *H04L 43/062* (2013.01); *H04L 47/2483* (2013.01)

(58) Field of Classification Search
CPC . H04L 43/062; H04L 47/2483; H04L 43/026; H04L 43/024; H04L 43/0829; H04L 43/0852; H04L 43/0876; H04L 45/48; H04L 45/54
See application file for complete search history.

(56) References Cited

U.S. PATENT DOCUMENTS

| 7,251,245 | B2 | 7/2007 | Oeman | |
|---|---|---|---|---|
| 7,817,549 | B1* | 10/2010 | Kasralikar | ............ H04L 43/026 370/235 |
| 9,843,535 | B2 | 12/2017 | Hao et al. | |
| 9,935,885 | B1 | 4/2018 | Shen et al. | |
| 10,097,464 | B1 | 10/2018 | Conlon et al. | |

(Continued)

*Primary Examiner* — Mohamed A Kamara
(74) *Attorney, Agent, or Firm* — Fountainhead Law Group, PC (57) ABSTRACT

Systems and methods are provided herein for using a network device's software (e.g., programs executed on a CPU) to maintain and export flow data while offloading network resource intensive tasks to the network device's hardware. This may be accomplished by a network device determining whether a new flow should be tracked using only the software table (e.g., table stored only on the CPU) of the network device or whether certain flow tracking tasks (e.g., counting/parsing) can be offloaded to a hardware table (e.g., counter table in a hardware flow cache) of the network device. The network device may use one or more conditions to determine whether the new flow should be tracked using the software table or by both the software and the hardware table. The conditions can relate to the characteristics of the new flow, resource information, prioritization of the new flow, etc.

20 Claims, 6 Drawing Sheets (56) References Cited

U.S. PATENT DOCUMENTS

| | | | |
|---|---|---|---|
| 2011/0164503 A1* | 7/2011 | Yong | H04L 69/22 |
| | | | 370/235 |
| 2013/0064079 A1* | 3/2013 | Zhang | H04L 43/026 |
| | | | 370/230 |
| 2013/0136011 A1* | 5/2013 | Tardo | H04L 63/1416 |
| | | | 370/252 |
| 2017/0134277 A1* | 5/2017 | Bifulco | H04L 45/745 |
| 2022/0166691 A1 | 5/2022 | Johnson et al. | |
| 2022/0231956 A1* | 7/2022 | Lu | H04L 47/30 |
| 2022/0360506 A1 | 11/2022 | Labonte et al. | |

* cited by examiner

SYSTEMS AND METHODS FOR TRACKING AND EXPORTING FLOWS IN SOFTWARE WITH AUGMENTED PROCESSING IN HARDWARE

CROSS REFERENCE TO RELATED APPLICATIONS

This application is a continuation of patent application Ser. No. 17/314,451, filed May 7, 2021, the contents of which is incorporated herein by reference in its entirety for all purposes.

BACKGROUND

The present disclosure relates to methods and apparatuses used in network telemetry, in particular, optimally tracking and exporting flow information for a network.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Network telemetry or telemetry involves the collection of data in a network from data sources. Telemetry uses automated tools and processes to collect measurements and monitor traffic flow in a network. Telemetry is vital for troubleshooting network issues relating to congestion, latency, jitter, packet loss rate, bandwidth, etc. A flow can be a sequence of packets that share some common attribute (e.g., source IP address, destination IP address, network protocol, etc.). A typical network telemetry setup involves one or more network devices tracking flows and then sending the flow information to a collector where the flow information is used to build a network state of the network devices thereby allowing network operators to monitor the network and address any network issues.

Current telemetry methods track and export flow information using, generally speaking, one of two methods. The first method is a software-based technique where the tracking and exporting of flow information is handled by the software of a network device. Software can be defined as any program executed on a central processing unit (CPU), for example a general-purpose CPU. The software-based method is flexible but requires a significant amount of network resources (e.g., CPU usage). For example, tracking flows can require network intensive tasks such as packet parsing, storing of packet information, searching flow table states, etc. As the number of flows increases, the software table's queues overflow, slowing down the tracking and exporting of flows while also consuming a significant amount of network resources. Accordingly, software-based flow tracking does not scale well as the number of flows being tracked and exported grows. The second method is a hardware-based method where the tracking and exporting of flow data is done using customized hardware of the network device. Hardware can be defined as network elements with limited programming capabilities (e.g., counter tables, flow caches, packet processing unit, etc.). The hardware-based method can be faster and can require less network resources than software-based approaches. But this method lacks flexibility and requires specific and/or customized hardware to implement. It also lacks any type of methodology to prioritize certain flows over other flows. For example, in a hardware-based method if the number of flows to be tracked exceeds the number of flows that the hardware can track, flows are discarded sequentially regardless of their importance. Accordingly, current techniques lack a method of tracking and exporting flows that efficiently uses software to maintain and export flow data while offloading network resource intensive tasks (e.g., packet counting, packet parsing, etc.) to the hardware, wherein the methodology can be implemented on network devices that do not natively support hardware based flow tracking.

Various systems and methods described herein address these problems by providing a method that efficiently uses a network device's software (e.g., programs executed on a CPU) to maintain and export flow data while offloading network resource intensive tasks to the network device's hardware. To begin tracking flow data, a network administrator can configure a network device, such as router, switch, etc., to sample data packets at a certain rate. The network device will sample a first data packet based on the sampling rate and the software of the network device will determine if the first packet corresponds to a new flow. For example, the network device will compare the first data packet to a table of flows, wherein each flow in the table corresponds to some attribute (e.g., source IP address, destination IP address, network protocol, etc.) of a data packet. If the network device determines that no flow, in the table of flows, corresponds to the first data packet, the network device identifies that the first data packet corresponds to a new flow. The network device determines whether the new flow should be tracked using only the software table (e.g., table stored only on the CPU) of the network device or whether flow tracking tasks (e.g., counting/parsing) can be offloaded to a hardware table (e.g., counter table in a hardware flow cache) of the network device. The network device may use one or more conditions to determine whether the new flow should be tracked using the software table or by both the software and the hardware table. The conditions can relate to the characteristics of the new flow, resource information, prioritization of the new flow, etc. For example, the characteristics of the new flow (e.g., activity of the flow, flow priority, etc.) may indicate that the new flow should be tracked using the hardware table and the software table as opposed to just the software table. In another example, resource information related to the hardware table (e.g., number of total flows installed in the hardware table) may indicate that the new flow should be tracked using the software table without using the hardware table. If, based on the one or more conditions, the network device determines that the flow can be tracked using the hardware table, the network device installs a new entry corresponding to the new flow in the hardware table. Once the new flow entry is installed in the hardware table, the hardware table begins counting and parsing data packets that correspond to the new flow entry and records the flow information in the hardware table. The network device will monitor the recorded flow information periodically and update the software table to reflect the flow information. The network device can monitor the hardware table by periodically scanning the hardware table, receiving notifications from the hardware table, and/or similar such methodologies. This process allows the software table to have accurate flow information without having to count and parse every data packet corresponding to the new flow because the hardware table does it instead. This process provides a flexible method that tracks and exports flow data that is scalable, efficient, and can be used on platforms that do not natively support hardware-based flow tracking.

Figure 1:
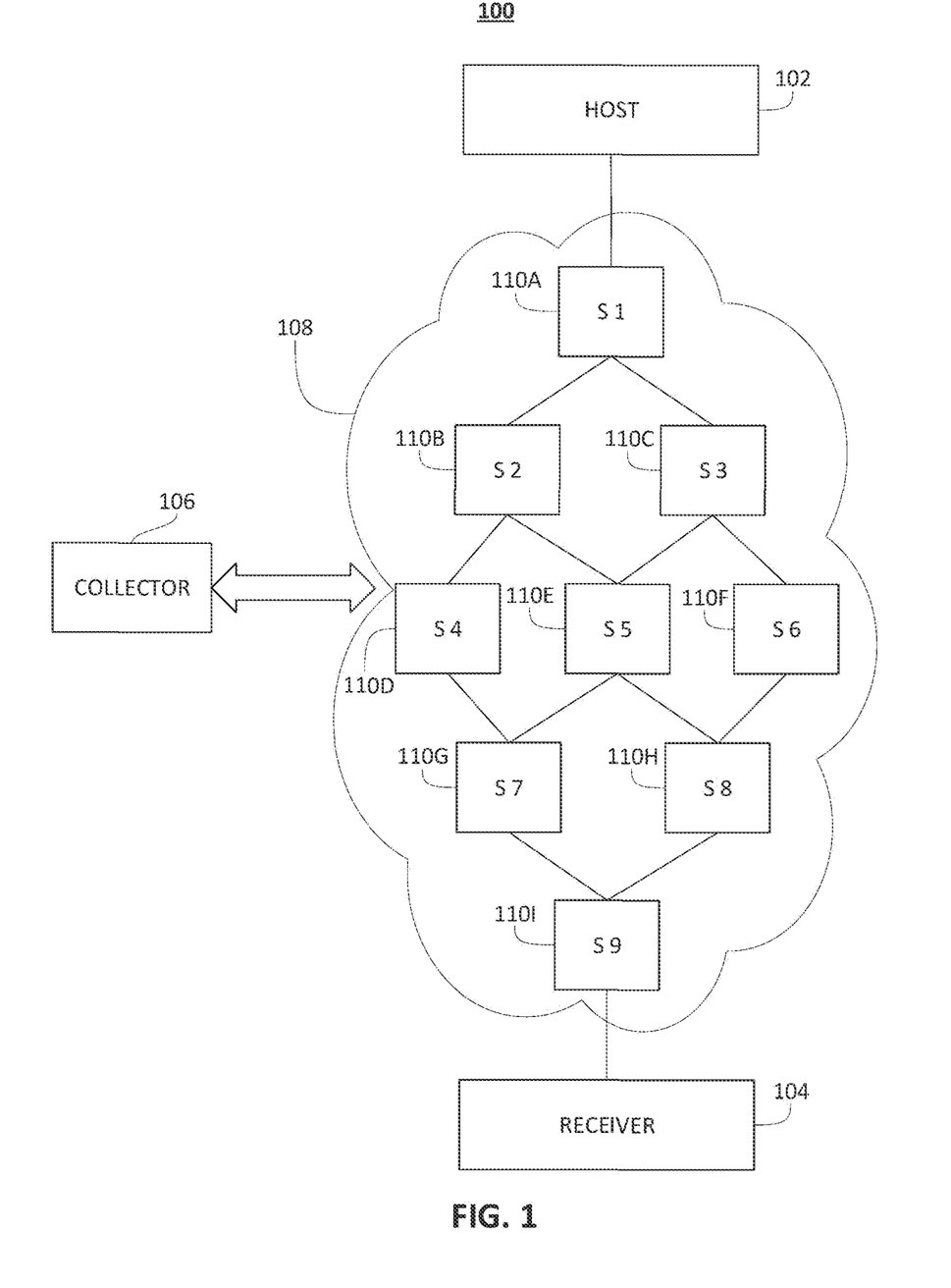
FIG. 1 shows an illustrative network topology of a system for collecting packet data that uses a network device's software to maintain and export flow data while offloading network resource intensive tasks to the network device's hardware, in accordance with some embodiments of the disclosure.

FIG. 1 shows an illustrative network topology of a system 100 for collecting packet data that uses a network device's software to maintain and export flow data while offloading network resource intensive tasks to the network device's hardware, in accordance with some embodiments of the disclosure. System 100 includes a host 102, receiver 104, collector 106, and network devices 110A-I. In some embodiments, links between devices 102, 104, 106, and 110A-I may be an overlay of virtual links configured over an underlay of physical devices. The network 108 can be a wired or wireless network. In some embodiments, the network 108 may be a local area network, wide area network, a virtual private network, ethernet virtual private network, ethernet connection or another type of network that provides the capability to collect and report packet and packet flow data. It is understood that other types of network topologies that include different combinations of network devices and links (e.g., greater or fewer number of network elements, subnets, routers, and switches) than shown may be employed to collect packet data.

The host 102, may be a computer, mobile device, or other electronic device capable of connecting to a network device (e.g., 110A) and/or to the network 108. The receiver 104 may be a computer, mobile device, or other electronic device capable of receiving a data packet.

The network devices 110A-I can be switches, routers, hubs, bridges, gateways, virtual machines or other types of packet receiving and forwarding devices. In some embodiments, a first network device 110A acts as an ingress point or a first hop for a packet that is sent from the host 102 and destined for receiver 104. In some embodiments, the first network device 110A acts as an egress point for a packet that is sent from the receiver 104 and destined for host 102. In some embodiments, the first network device 110A acts as an egress point for packets originating from the first network device 110A destined for host 102. In some embodiments, a second network device 110I acts as an egress point or a last hop for a packet that is sent from the host 102 and destined for receiver 104.

The collector 106 is configured to receive and process flow information. In some embodiments, network devices 110A-I send flow information to the collector 106. The flow information can represent the status of a packet and/or the status of a flow. In some embodiments, the collector 106 is configured to receive flow information from all network devices 110A-I in network 108. In some embodiments, the collector 106 is configured to receive flow information from a select number of network devices that are along the path of a desired packet flow.

In some embodiments, a first network device 110A forwards data packets to and from host 102 using hardware. In some embodiments, the hardware of the first network device 110A is configured to sample data packets of the data packets being forwarded to and from the host 102 at a certain rate. In some embodiments, the sampling rate is based on a default sampling rate, a network administrator defined sampling rate, and/or similar such parameters. The first network device 110A samples a first data packet received from the host 102 based on the sampling rate and determines if the first data packet corresponds to a new flow. In some embodiments, the first network device 110A compares the first data packet to a table of flows, wherein each flow in the table corresponds to some attribute (e.g., source IP address, destination IP address, network protocol, etc.) of the data packet. If the first network device 110A determines that no flow, in the table of flows, corresponds to the first data packet, the network device identifies that the first data packet corresponds to a new flow.

In some embodiments, in response to determining that the first data packet corresponds to a new flow the first network device 110A installs a flow entry corresponding to the new flow into a software table (e.g., table stored on the CPU). The first network device determines if the new flow should be tracked using only the software table of the first network device 110A, or the software table and a hardware table (e.g., counter table in a hardware flow cache) of the first network device 110A. In some embodiments, the first network device 110A uses one or more conditions to determine if the new flow should be tracked using only the software table, or the software table and the hardware table of the network device 110A. In some embodiments, the conditions can relate to the characteristics of the new flow (e.g., activity of the flow, flow priority, etc.), resource information related to the first network device 110A, or similar such information. For example, if the new flow corresponds to data packets larger than a certain threshold (e.g., 2,000 bytes) a condition may indicate that the flow should be tracked using the software table and the hardware table of the first network device 110A. In another example, the resource information may comprise the number of total flows installed in the hardware table. In some embodiments, if the number of total flows installed in the hardware table is larger than a certain threshold (e.g., 8,000 total flows) a condition may indicate that the flow should be tracked using only the software table of the first network device 110A.

In some embodiments, based on the one or more conditions the first network device 110A determines that the new flow should be tracked using the software table and the hardware table of the first network device 110A and installs a new entry corresponding to the new flow in the hardware table of the first network device 110A. After the new flow entry is installed in the hardware table of the first network device 110A, the first network device 110A begins counting and/or parsing data packets that correspond to the new flow entry using the hardware table. For example, when the hardware of the first network device 110A receives a data packet, it determines if the data packet corresponds to a flow entry installed in the hardware's flow table. For example, the hardware of the first network device 110A can compare the destination and/or source IP address of the packet with a plurality of flow entries installed in the hardware's flow table. If the data packet does not correspond to a flow entry the hardware forwards the packet as normal and no information is recorded. If the data packet does correspond to a flow entry, the hardware counts and/or parses the data packet. The hardware of the first network device 110A stores the flow information in one or more hardware tables.

In some embodiments, the first network device 110A monitors the flow information stored in the one or more hardware tables and updates the software table to reflect the flow information. For example, the first network device 110A can compare the hardware table and the software table after a time period. In some embodiments, the time period can be a default time period and/or a time period selected by a network administrator. In some embodiments, the time period can change (e.g., shorten/lengthen based on the amount of data traffic). In some embodiments, the first network device 110A updates the software table based on the flow information recorded by the hardware table. For example, if a first entry corresponding to a first flow in the hardware table comprises flow information not included a second entry corresponding to the first flow in the software table, the first network device 110A updates the software table to include the flow information.

In some embodiments, the first network device 110A is configured to send flow information related to entries in the software table to the collector 106. In some embodiments, the first network device 110A sends the flow information after a period of time and/or after a threshold amount of flow information has been collected. In some embodiments, the first network device 110A sends the flow information based on receiving a flow information request from the collector 106.

Figure 2:
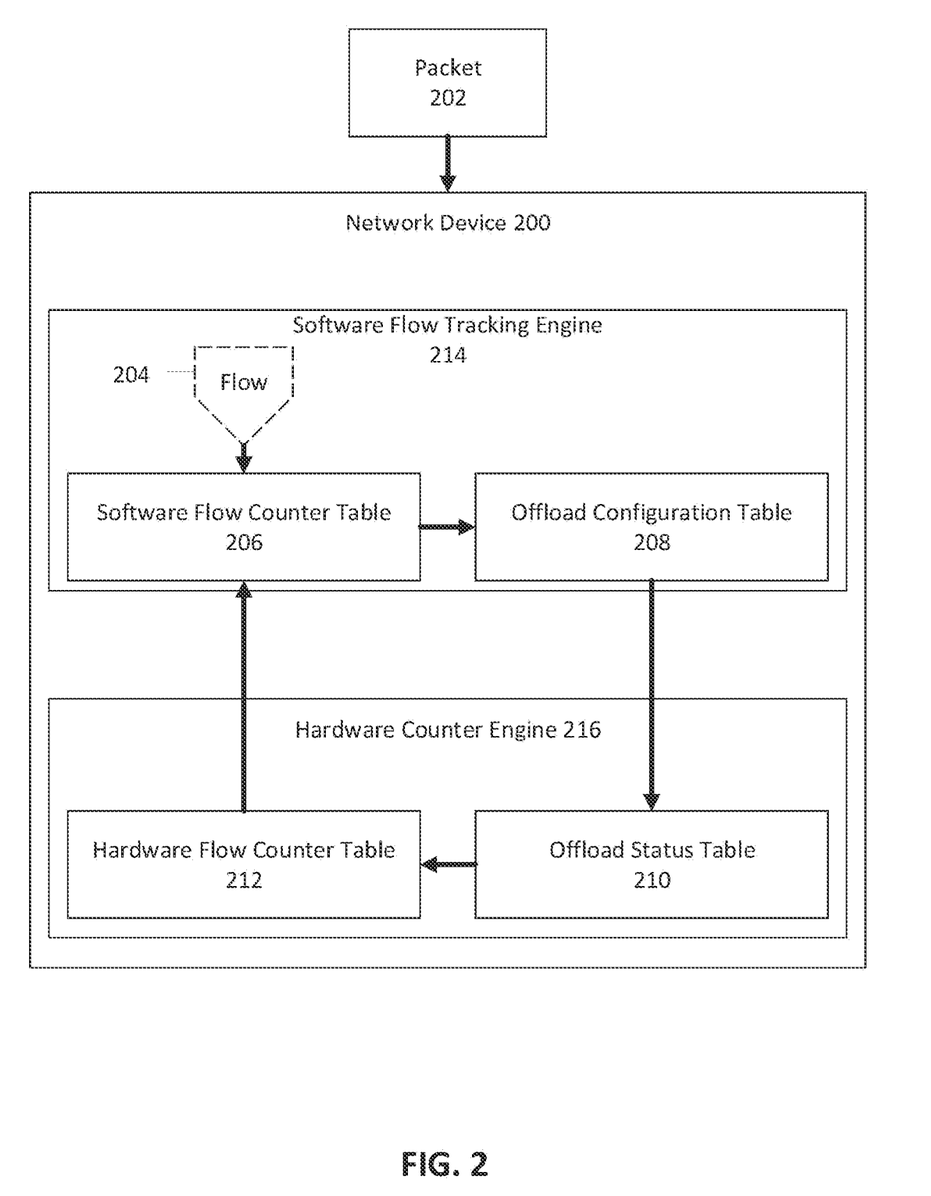
FIG. 2 shows a diagram of new flow entry being processed by an illustrative network device, in accordance with some embodiments of the disclosure.

FIG. 2 shows a diagram of a new flow entry being processed by an illustrative network device 200, in accordance with some embodiments of the disclosure. In particular, network device 200 of FIG. 2 may be any of the network devices 110A-I depicted in FIG. 1. Network device 200 may be a router (e.g., L3 or L2 device), an L3 switch, an L2 router, or a host, and/or any other computing device that may be configured to participate in EVPN switching or routing. Network device 200 comprises a software flow tracking engine 214 and a hardware counter engine 216. In some embodiments, the software flow tracking engine 214 and the hardware counter engine 216 are two agents executed on network device 200's central processing unit.

In some embodiments, the network device 200 forwards data packets to and from a host using hardware (e.g., application-specific integrated circuits (ASICs), wherein the hardware is configured to sample data packets of the data packets being forwarded to and from the host at a certain rate. In some embodiments, the sampling rate is based on a default sampling rate, a network administrator defined sampling rate, and/or similar such parameters. Based on the sampling rate, the network device 200 samples a first data packet 202 received from the host and determines if the first data packet 202 corresponds to a new flow. In some embodiments, the network device 200 determines packet attributes related to the first data packet 202 and compares the packet attributes to entries in the software flow counter table 206.

Software flow counter table 206 comprises a plurality of entries, wherein each entry corresponds to a flow. The plurality of entries in the software flow counter table 206 are associated with packet attributes (e.g., source IP address, destination IP address, network protocol, etc.). If the network device determines that no entries in the software flow counter table 206 correspond to one or more packet attributes of the first data packet 202, the network device 200 identifies that the first data packet 202 corresponds to a new flow 204. If the network device 200 determines that the first data packet 202 corresponds to a new flow 204 the network device 200 installs a new entry into the software flow counter table 206 corresponding to the new flow.

In some embodiments, after the network device 200 installs the new flow entry into the software flow counter table 206, the network device 200 determines if the new flow should be tracked using only the software flow counter table 206, or use the software flow tracking engine 214 and the hardware counter engine 216. In some embodiments, the hardware counter engine 216 uses counters located in the hardware of the network device 200 to update the hardware flow counter table 212. In some embodiments, the network device 200 uses one or more conditions to determine if the new flow should be tracked using only the software flow counter table 206, or use the software flow tracking engine 214 and the hardware counter engine 216.

In some embodiments, based on the one or more conditions, network device 200 determines that the new flow should be tracked using the software flow tracking engine 214 and the hardware counter engine 216. In some embodiments, to install the new flow entry into the hardware flow counter table 212 the network device generates an entry in the offload configuration table 208. The offload configuration table 208 comprises all flows that the network device 200 determines should be tracked using the software flow tracking engine 214 and the hardware counter engine 216.

In some embodiments, based on the new flow entry being installed in the offload configuration table 208 a new entry is generated in the offload status table 210. In some embodiments, the offload status table 210 comprises a plurality of entries, wherein each entry indicates the installation status (e.g., processing, processed, installed, etc.) of the hardware flow counter table 212. In some embodiments, the entries of the offload status table 210 mirrors the entries in the offload configuration table 208.

In some embodiments, the hardware flow counter table 212 is populated according to the entries in the offload status table 210. In some embodiments, each entry of the hardware flow counter table 212 contains a counter corresponding to a flow. In some embodiments, the hardware counter engine 216 uses counters located in the hardware of the network device 200 to update entries of the hardware flow counter table 212. In some embodiments, entries in the hardware flow counter table 212 comprise flow information related to their respective flows. For example, the flow information can include the number of packets related to a flow, the number of bytes related to a flow, the ingress/egress interface of the flow, the entry creation time of the flow, the last time the flow was updated, and/or similar such information.

In some embodiments, the network device 200 updates the software flow counter table 206 based on the flow information recorded by the hardware flow counter table 212. In some embodiments, the network device 200 scans the hardware flow counter table 212 and the software flow counter table 206 and updates the software flow counter table 206 based on the flow information recorded in the hardware flow counter table 212. For example, if a first flow entry corresponding to a first flow 204 in the hardware flow counter table 212 comprises flow information not included in a second entry corresponding to the first flow 204 in the software flow counter table 206, the network device 200 updates the software flow counter table 206 to include the flow information. In some embodiments, when the network device 200 scans the hardware flow counter table 212 and software flow counter table 206 the network device 200 compares all entries in the software flow counter table 206 with all entries in the hardware flow counter table 212. In some embodiments, when the network device scans the hardware flow counter table 212 and the software flow counter table 206, the network device 200 compares one or some entries in the software flow counter table 206 with entries in the hardware flow counter table 212 that are associated with corresponding flows.

In some embodiments, based on some criteria (e.g., time period, flow information thresholds, etc.) a notification is generated causing the network device 200 to update the software flow counter table 206 based on flow information recorded in the hardware flow counter table 212. For example, the criteria may indicate that after the hardware flow counter table 212 records a number of packets (e.g., 10,000 packets) relating to a first flow 204 that a notification is generated. In some embodiments, the notification includes the flow information related to the first flow 204 and network device 200 is able to update an entry related to the first flow 204 in the software flow counter table 206 based on the flow information. In some embodiments, the notification relates to one, many, or all entries recorded in the hardware flow counter table 212. In some embodiments, the notification causes the network device 200 to scan the hardware flow counter table 212 and the software flow counter table 206, and update the software flow counter table 206 based on the flow information recorded by the hardware flow counter table 212.

In some embodiments, a hardware table may refer to hardware flow counter table 212 and/or offload status table 210. In some embodiments, a software table may refer to the software flow counter table 206 and/or offload configuration table 208. It is understood that other types of topologies that include different combinations and numbers of software and hardware tables than shown may be employed to process a new flow entry.

Figure 3:
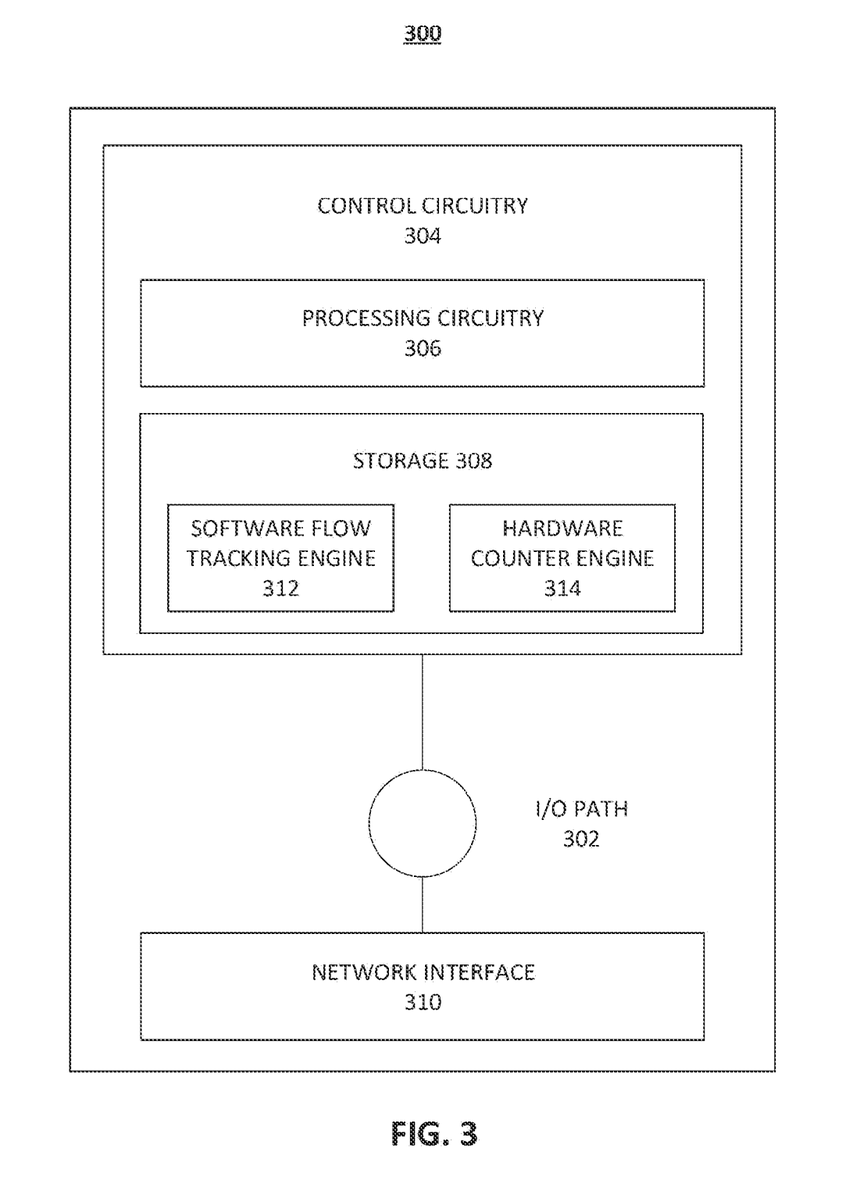
FIG. 3 shows a diagram of an illustrative network device that uses the network device's software to maintain and export flow data while offloading network resource intensive tasks to the network device's hardware, in accordance with some embodiments of the disclosure.

FIG. 3 shows a diagram of an illustrative network device that uses the network device's software to maintain and export flow data while offloading network resource intensive tasks to the network device's hardware, in accordance with some embodiments of the disclosure. In particular, a device 300 of FIG. 3 may be any of the devices depicted in FIG. 1 (e.g., devices 102, 104, 106, and 110A-I) or may be a physical or virtual device hosting any of physical or virtual devices 102, 104, 106, and 110A-I. Device 300 may be a router, an L3 switch, an L2 router, or a host, and/or any other computing device that may be configured to participate in EVPN switching or routing. Device 300 may receive data via data network interface 310 and provide the received data to control circuitry 304 via an input/output (I/O) path 302. Control circuitry 304 includes processing circuitry 306 and memory 308. Memory 308 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to network interface 310, which in turn connects device 300 to one or more other devices. For example, I/O path 302 may provide route packets to next hops listed in a forwarding table.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions suitable to implement any of the techniques described above or below.

Memory 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, memory 308 may include a table used for forwarding data packets. Multiple circuits may be provided to handle simultaneous processing functions. In some embodiments, device 300 may be a virtual device, wherein components 304, 306, 308, 302 and 310 are virtualized on top of another physical device. In some embodiments, storage 308 may comprise counter tables, flow caches, hardware tables, software tables, and/or packet processing units. In some embodiments, storage 308 may comprise software flow tracking engine 312 and/or hardware counting engine 314 that communicates with processing circuitry 306. In some embodiments, the software flow tracking engine 312 and the hardware counter engine 314 are two agents executed using device 300's control circuitry 304. In some embodiments, the software flow tracking engine 312 comprises one or more software tables for tracking flow information. In some embodiments, the hardware counter engine 314 uses counter tables, flow caches, packet processing units, etc. In some embodiments, the hardware counter engine 314 uses one or more hardware tables for tracking flow information.

Figure 4:
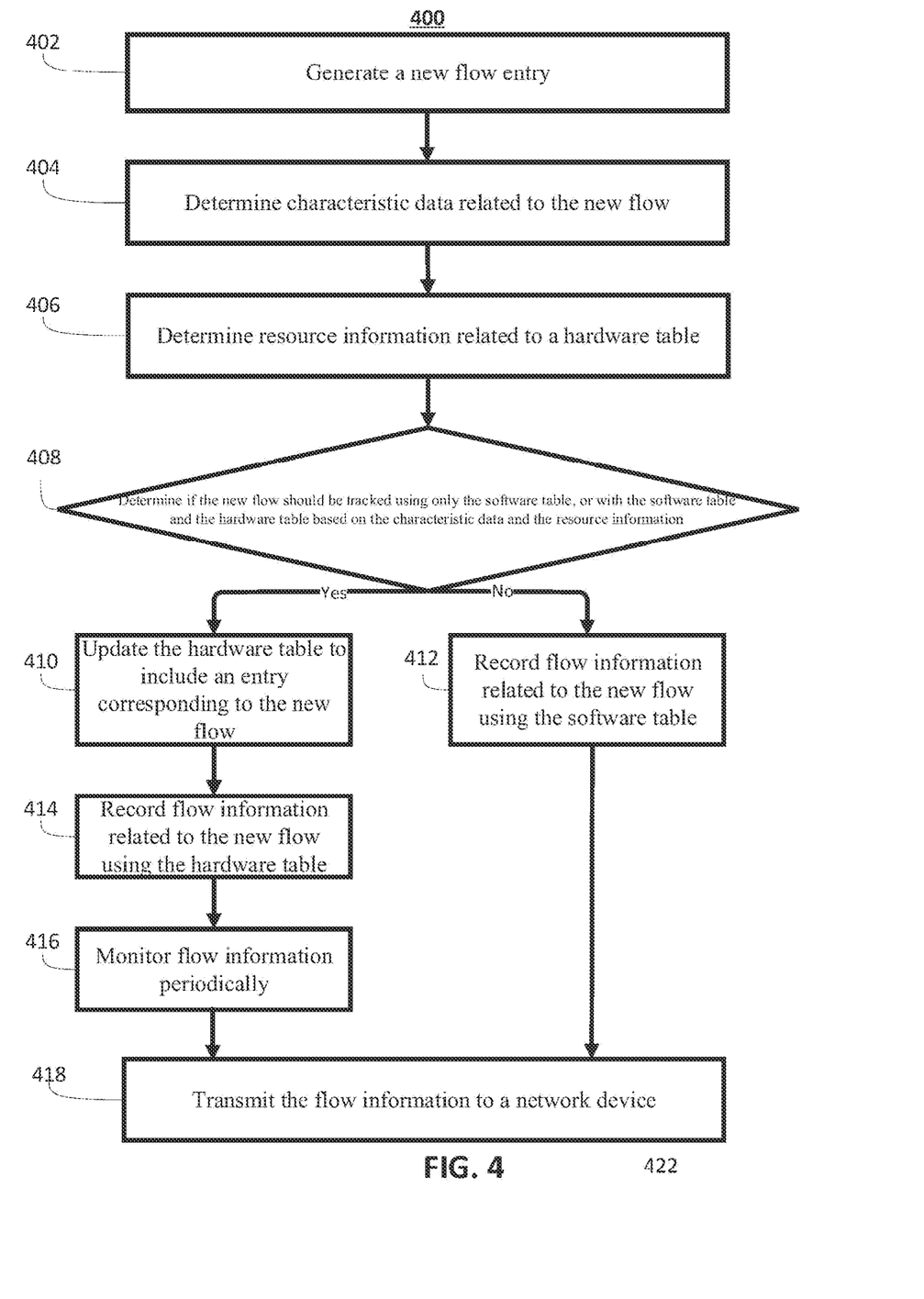
FIG. 4 is a flowchart of an illustrative process for using a network device's software to maintain and export flow data while offloading network resource intensive tasks to the network device's hardware, in accordance with some embodiments of the disclosure.

FIG. 4 is a flowchart of an illustrative process for using a network device's software to maintain and export flow data while offloading network resource intensive tasks to the network device's hardware, in accordance with some embodiments of the disclosure. Process 400 may be performed by physical or virtual control circuitry, such as control circuitry 304 of device 300 (FIG. 3). For example, process 400 may be performed by control circuitries of device 110A. In some embodiments, some steps of process 400 may be performed by one of several devices.

At step 402, control circuitry generates a new flow entry. In some embodiments, the new flow entry relates to a new flow and is generated in response to sampling a data packet and determining that there is no flow entry in a software table of the control circuitry related to the sampled data packet. In some embodiments, the new flow relates to a sequence of packets that share some common attribute (e.g., source IP address, destination IP address, network protocol, etc.).

In some embodiments, the new flow entry is installed into a software table (e.g., software flow counter table 206). In some embodiments, before installing the flow entry into the software flow counter table 206, the control circuitry determines that the flow entry should be tracked. In some embodiments, control circuitry uses a first set of conditions to determine if the new flow should be tracked. In some embodiments, the first set of conditions relate to packet characteristics, resource information, etc. In some embodiments, the first set of conditions may be default conditions, may be set by a network administrator, may be optimized over time using machine learning, etc. In some embodiments, some conditions may be weighted compared to other conditions. For example, a first condition can indicate that no new flows should be tracked using the software flow counter table 206 when the total number of flows installed in the software flow counter table 206 exceeds a threshold (e.g., 5,000 flows). The first condition may be weighted less than a second condition indicating that a high priority flow should be tracked using the software flow counter table 206. In such an example, the control circuitry generates a new flow entry corresponding to the high priority flow because the second condition is weighted higher than the first condition. In some embodiments, any number of conditions and weighting methodologies may be used.

At step 404, control circuitry determines characteristic data related to the new flow entry. In some embodiments, characteristic data related to the new flow includes the activity of the flow, flow priority, and/or similar such characteristics. The activity of the flow may relate to how often the control circuitry forwards packets that correspond to the new flow. For example, during a period of time, the control circuitry forwards more packets associated with an active flow compared to a less active flow. The activity of the flow can be determined by the control circuitry or may be predefined. In some embodiments, the activity of the flow is determined using attributes of the data packets associated with the flow. In some embodiments, a network administrator may define flows with data packets with particular attributes as having a certain priority level. For example, flows with data packets with a first source address may be defined as a higher priority than flows with data packets with a second source address.

At step 406, control circuitry determines resource information related to a hardware table. In some embodiments, the resource information related to the hardware table may comprise the total number of flows installed in the hardware table. In some embodiments, the resource information related to the hardware table may comprise the total number of flows installed in the hardware table of a certain priority and/or type. In some embodiments, the resource information related to the hardware table may comprise hardware limitations. In some embodiments, the control circuitry may retrieve the resource information from memory. In some embodiments, the control circuitry may determine the resource information by scanning the hardware table.

At step 408, control circuitry determines if the new flow should be tracked using only the software table, or with the software table and the hardware table based on the characteristic data and the resource information. In some embodiments, control circuitry uses a second set of conditions associated with the characteristic data and the resource information to determine if the new flow should be tracked using the software table and the hardware table. For example, if the resource information indicates that the number of total flows installed in the hardware table is larger than a certain threshold a condition may indicate that the flow should not be tracked using the hardware table. In another example, if the characteristic data indicates that the new flow corresponds to data packets larger than a certain threshold (e.g., 2,000 bytes) a condition may indicate that the flow should be tracked using the software table and the hardware table. In some embodiments, a condition may indicate that the new flow should or should not be tracked using the hardware table using only characteristic data or resource information. For example, if the resource information determines that the hardware table has no capacity for additional flows, then the control circuitry will determine that the new flow should not be tracked using the hardware table regardless of the characteristic data. In some embodiments, the second set of conditions may be default conditions, may be set by a network administrator, may be optimized over time using machine learning, etc. In some embodiments, some conditions of the second set of conditions may be weighted compared to other conditions. If, based on the characteristic data and the resource information, the control circuitry determines that the new flow should be tracked using the software table and the hardware table the process continues to step 410. If, based on the characteristic data and the resource information, the control circuitry determines that the new flow should not be tracked using the hardware table the process continues to step 412.

At step 412, control circuitry records flow information related to the new flow using only the software table. In some embodiment, the software table begins counting and parsing data packets that correspond to the new flow entry and records the flow information in the software table. For example, when the control circuitry receives a data packet, the control circuitry, using software, determines if the data packet corresponds to a flow entry installed in the software's flow table. For example, the control circuitry compares the destination and/or source IP address of the packet with a plurality of flow entries installed in the software table. If the data packet does not correspond to a flow entry the control circuitry does not record any information. If the data packet does correspond to a flow entry, the control circuitry counts and/or parses the data packet using the software table.

At step 410, control circuitry updates the hardware table to include an entry corresponding to the new flow. In some embodiments, the control circuitry updates a hardware flow counter table to include an entry corresponding to the new flow as described in FIG. 2.

At step 414, control circuitry records flow information related to the new flow entry using the hardware table. In some embodiment, once the new flow entry is installed in the hardware table, the hardware table records the flow information recorded by counters located in the hardware of the control circuitry. The hardware table's entries reflect flow information collected by the counters. For example, when a counter receives a data packet, the counter determines if the data packet corresponds to a flow entry installed in the counter table. For example, the counter compares the destination and/or source IP address of the packet with a plurality of flow entries installed in the counter table. If the data packet does not correspond to a flow entry the counter does not record any information. If the data packet does correspond to a flow entry, the counter counts and/or parses the data packet.

At step 416, control circuitry monitors the flow information periodically. In some embodiments, control circuitry monitors the flow information stored in the hardware table and updates the software table to reflect the flow information. For example, the control circuitry can scan the hardware table and the software table after a time period. In some embodiments, the time period can be a default time period and/or a time period selected by a network administrator. In some embodiments, the time period can change (e.g., shorten/lengthen based on the amount of data traffic). In some embodiments, the control circuitry updates the software table based on flow information recorded in the hardware table. For example, if a first flow entry corresponding to a first flow in the hardware table comprises flow information not included in a second entry corresponding to the first flow in the software table the control circuitry updates the software table to include the flow information. In some embodiments, when the control circuitry scans the hardware table and software table the control circuitry compares all entries in the software table with all entries in the hardware table. In some embodiments, when the control circuitry scans the hardware table and software table the control circuitry compares one or some entries in the software table with entries in the hardware table that are associated with corresponding flows.

In some embodiments, based on some criteria (e.g., time period, flow information thresholds, etc.) a notification is generated causing the control circuitry to update the software table. For example, the criteria may indicate to generate a notification after the hardware table records a number of packets (e.g., 10,000 packets) relating to a first flow. In some embodiments, the notification includes the flow information related to the first flow and control circuitry is able to update an entry related to the first flow in the software table based on the flow information. In some embodiments, the notification relates to one, many, or all entries recorded in the hardware table. In some embodiments, the notification causes the control circuitry to scan the hardware table and the software table and update the software table based on the flow information recorded by the hardware table.

At step 418, control circuitry transmits the flow information to a network device. In some embodiments, the control circuitry transmits the flow information stored in the software table to a collector (e.g., collector 106 in FIG. 1). In some embodiments, the control circuitry sends the flow information after a period of time and/or after a threshold amount of flow information has been collected. In some embodiments, the control circuitry sends the flow information based on receiving a flow information request from the collector.

Figure 5:
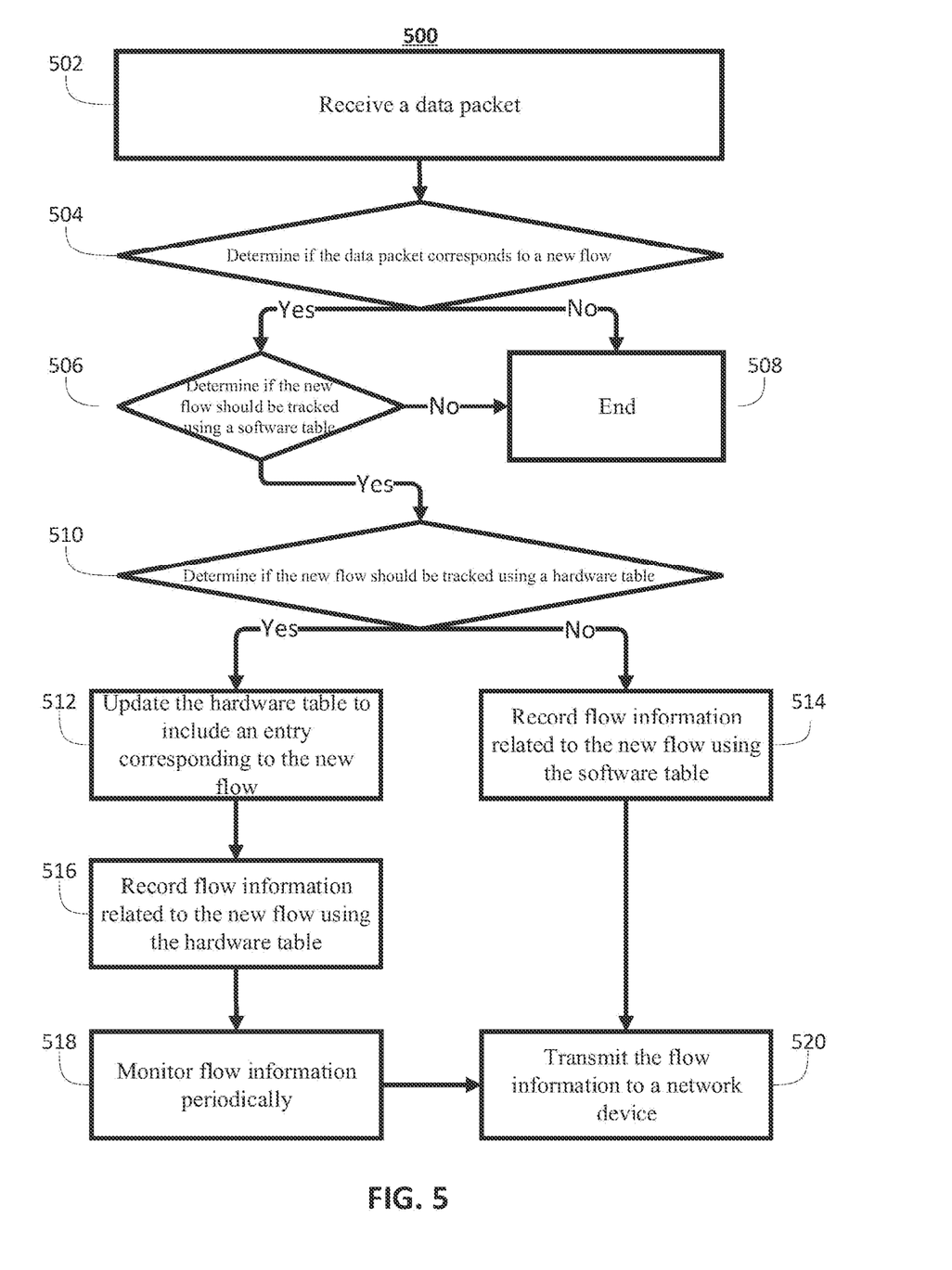
FIG. 5 is another flowchart of an illustrative process for using a network device's software to maintain and export flow data while offloading network resource intensive tasks to the network device's hardware, in accordance with some embodiments of the disclosure.

FIG. 5 is a flowchart of an illustrative process for using a network device's software to maintain and export flow data while offloading network resource intensive tasks to the network device's hardware, in accordance with some embodiments of the disclosure. In some embodiments, FIG. 5 comprises similar or the same steps as FIG. 4. In some embodiments, FIG. 5 describes specific implementations of one, some, or all of the steps described in FIG. 5. For example, FIG. 5 describes one type of implementation of generating a new flow entry. Process 500 may be performed by physical or virtual control circuitry, such as control circuitry 304 of device 300 (FIG. 3). For example, process 500 may be performed by control circuitries of device 110A.

In some embodiments, some steps of process 500 may be performed by one of several devices.

At step 502, control circuitry receives a data packet. In some embodiments, control circuitry is configured to receive and forward a plurality of data packets. In some embodiments, the data packet's source or destination is a host (e.g., host 102 in FIG. 1). In some embodiments, control circuitry samples a first data packet of the plurality of data packets according to a sampling rate (e.g., 1 packet per 10,000 packets). In some embodiments, the sampling rate is based on a default sampling rate, a network administrator defined sampling rate, and/or similar such parameters.

At step 504, control circuitry determines whether the sampled data packet corresponds to a new flow. In some embodiments, control circuitry determines packet attributes related to the data packet and compares the packet attributes to entries in a software table (e.g., software flow counter table 206 in FIG. 2). In some embodiments, the software table comprises a plurality of entries, wherein each entry corresponds to a flow. The plurality of entries in the software table can be associated with packet attributes (e.g., source IP address, destination IP address, network protocol, etc.). If the control circuitry determines that no entry or entries of the plurality of entries in the software table correspond to one or more packet attributes of the first data packet, control circuitry installs a new entry into the software table corresponding to the new flow and the process continues to step 506.

If the control circuitry determines that an entry or entries of the plurality of entries in the software table corresponds to one or more packet attributes of the first data packet, the control circuitry determines that the data packet does not correspond to a new flow and the process continues to step 508. At step 508, the process 500 ends. In some embodiments, control circuitry updates the entry or entries corresponding to the one or more packet attributes of the first data packet. For example, the total number of packets recorded by the entry or entries related to the non-new flow will increase by one packet due to the first data packet being sampled.

At step 506, control circuitry determines if the flow entry should be tracked using the software table. In some embodiments, the control circuitry makes this determination using a first set of one or more conditions. In some embodiments, the first set of one or more conditions relate to the characteristics of the new flow (e.g., activity of the flow, flow priority, etc.), resource information related to the software table, and/or similar such information. In some embodiments, the first set of one or more conditions may be default conditions, may be set by a network administrator, may be optimized over time using machine learning, etc. If, based on the first set of conditions, the control circuitry determines that the new flow should be tracked using the software table the process continues to step 510. If, based on the first set of conditions, the control circuitry determines that the new flow should not be tracked using the software table the process ends at step 508. In some embodiments, at step 508 the control circuitry deletes the flow entry corresponding to the new flow from the software table. In some embodiments, at step 508 the control circuitry queues the flow entry corresponding to the new flow until the control circuitry is able to record flow information related to the flow entry.

At step 510, control circuitry determines if the new flow should be tracked using the software table and a hardware table. In some embodiments, the control circuitry makes this determination using a second set of one or more conditions as described above in FIG. 4. In some embodiments, the second set of one or more conditions relate to the characteristics of the new flow (e.g., activity of the flow, flow priority, etc.), resource information related to the hardware table, and/or similar such information. In some embodiments, the second set of one or more conditions are used to determine if the new flow should be tracked using the hardware table (e.g., hardware flow counter table 212 in FIG. 2) and the software table (e.g., software flow counter table 206 in FIG. 2). For example, if the second set of one or more conditions indicate that the new flow should be tracked using the software table and the hardware table, the new flow is tracked using the software table and the hardware table. In some embodiments, the second set of one or more conditions prioritize offloading network resource intensive tasks to the hardware table. In some embodiments, the second set of one or more conditions may be default conditions, may be set by a network administrator, may be optimized over time using machine learning, etc. If, based on the second set of one or more conditions, the control circuitry determines that the new flow should be tracked using the software table and the hardware table the process continues to step 512. If, based on the one or more conditions, the control circuitry determines that the new flow should be tracked using only the software table the process continues to step 514.

At step 512, control circuitry updates the hardware table to include an entry corresponding to the new flow. In some embodiments, the control circuitry updates a hardware flow counter table to include an entry corresponding to the new flow as described in FIG. 2.

At step 514, control circuitry records flow information related to the new flow using the software table. In some embodiment, the software table begins counting and parsing data packets that correspond to the new flow entry and records the flow information in the software table. For example, when the control circuitry receives a data packet, the control circuitry, using software, determines if the data packet corresponds to a flow entry installed in the software's flow table. For example, the control circuitry compares the destination and/or source IP address of the packet with a plurality of flow entries installed in the software table. If the data packet does not correspond to a flow entry the control circuitry does not record any information. If the data packet does correspond to a flow entry, the control circuitry counts and/or parses the data packet using the software table.

At step 516, control circuitry records flow information related to the new flow entry using the hardware table. In some embodiments, once the new flow entry is installed in the hardware table, the hardware table records the flow information recorded by counters located in the hardware of the control circuitry. The hardware table's entries reflect flow information collected by the counters. For example, when a counter receives a data packet, the counter determines if the data packet corresponds to a flow entry installed in the counter table. For example, the counter compares the destination and/or source IP address of the packet with a plurality of flow entries installed in the counter table. If the data packet does not correspond to a flow entry the counter does not record any information. If the data packet does correspond to a flow entry, the counter counts and/or parses the data packet.

At step 518, control circuitry monitors the flow information periodically. In some embodiments, control circuitry monitors the flow information stored in the hardware table and updates the software table to reflect the flow information. In some embodiments, the control circuitry uses scanning and/or notifications as discussed above to monitor the flow information of the hardware table and then update the software table accordingly.

At step 520, control circuitry transmits the flow information to a network device. In some embodiments, the control circuitry transmits the flow information to a collector (e.g., collector 106 in FIG. 1). In some embodiments, the control circuitry sends the flow information after a period of time and/or after a threshold amount of flow information has been collected. In some embodiments, the control circuitry sends the flow information based on receiving a flow information request from the collector.

Figure 6:
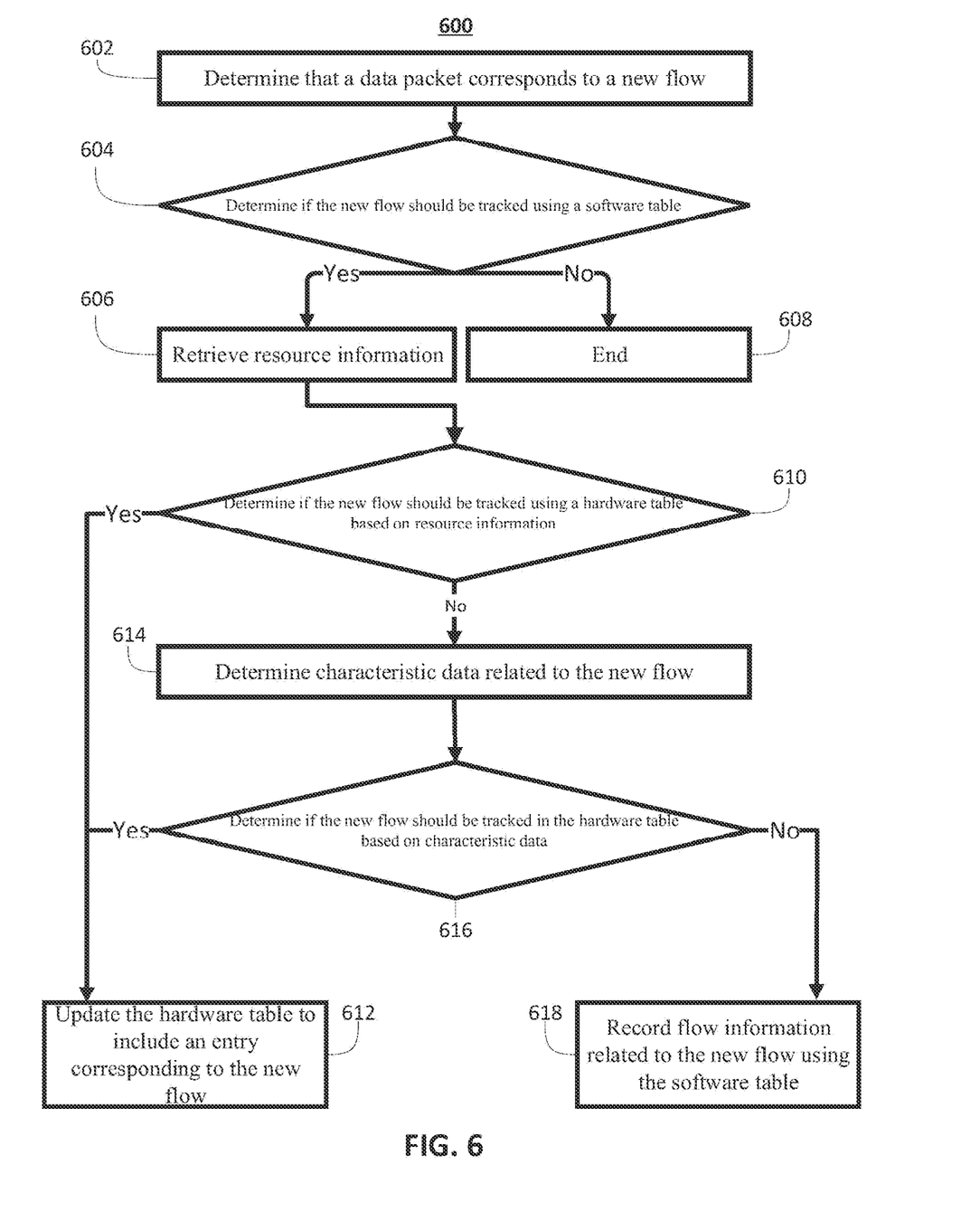
FIG. 6 is another flowchart of an illustrative process for using a network device's software to maintain and export flow data while offloading network resource intensive tasks to the network device's hardware, in accordance with some embodiments of the disclosure.

FIG. 6 is a flowchart of an illustrative process for using a network device's software to maintain and export flow data while offloading network resource intensive tasks to the network device's hardware, in accordance with some embodiments of the disclosure. In some embodiments, FIG. 6 comprises similar or the same steps as FIG. 4 and FIG. 5. In some embodiments, FIG. 6 describes specific implementations of one, some, or all of the steps described in FIG. 4 and FIG. 5. For example, FIG. 6 demonstrates one type of implementation for determining if a new flow should be tracked using a hardware table. Process 600 may be performed by physical or virtual control circuitry, such as control circuitry 304 of device 300 (FIG. 3). For example, process 600 may be performed by control circuitries of device 110A. In some embodiments, some steps of process 600 may be performed by one of several devices.

At step 602, control circuitry determines that a data packet corresponds to a new flow. As discussed above, the control circuitry can determine packet attributes related to the data packet and compare the packet attributes to entries in a software table (e.g., software flow counter table 206 in FIG. 2). If the control circuitry determines that no entry or entries of the plurality of entries in the software table correspond to one or more packet attributes of the first data packet, the control circuitry determines that the data packet corresponds to a new flow and the process continues to step 604.

At step 604, control circuitry determines if the flow should be tracked using the software table. In some embodiments, the control circuitry makes this determination using a first set of one or more conditions. In some embodiments, the first set of conditions relate to the characteristics of the new flow (e.g., activity of the flow, flow priority, etc.), resource information related to the software table and/or hardware table, and/or similar such information. In some embodiments, the first set of one or more conditions may be default conditions, may be set by a network administrator, may be optimized over time using machine learning, etc. If, based on the one or more conditions, the control circuitry determines that the new flow should be tracked using the software table the process continues to step 606. If, based on the one or more conditions, the control circuitry determines that the new flow should not be tracked using the software table the process ends at step 608. In some embodiments, in step 608 the control circuitry deletes the flow entry corresponding to the new flow from the software table. In some embodiments, in step 608 the control circuitry ques the flow entry corresponding to the new flow until the control circuitry is able to record flow information related to the flow entry.

At step 606, control circuitry retrieves resource information. In some embodiments the resource information relates to the hardware table and/or the software table. As discussed above, the resource information related to the hardware table may comprise the total number of flows installed in the hardware table, the total number of flows installed in the hardware table of a certain priority and/or type, hardware limitations, and/or similar such information. In some embodiments, the resource information related to the software table includes similar types of information as the resource information related to the hardware table. In some embodiments, the control circuitry may retrieve the resource information from memory. In some embodiments, the control circuitry may determine the resource information related to the hardware table by scanning the hardware table and/or may determine resource information related to the software table by scanning the software table.

At step 610, control circuitry determines if the new flow should be tracked using the software table and the hardware table based on the resource information retrieved in step 606. In some embodiments, control circuitry uses a second set of conditions associated with the resource information to determine if the new flow should be tracked using the software table and the hardware table. For example, if the resource information indicates that the number of total flows installed in the hardware table is larger than a certain threshold a condition may indicate that the flow should not be tracked using the hardware table. In another example, if the resource information determines that the software table has no capacity for counting additional flows, then the control circuitry will determine that the new flow should be tracked using the hardware table regardless of the resource information related to the hardware table. The control circuitry can determine if the new flow should be tracked using the hardware table based on resource information related to the hardware table, resource information related to the software table, or a combination of the two. In some embodiments, the second set of one or more conditions may be default conditions, may be set by a network administrator, may be optimized over time using machine learning, etc. In some embodiments, some conditions may be weighted compared to other conditions. If, based on the resource information, the control circuitry determines that the new flow should be tracked using the software table and the hardware table the process continues to step 612. If, based on the resource information, the control circuitry determines that the new flow should not be tracked using the hardware table the process continues to step 614.

At step 612, control circuitry updates the hardware table to include an entry corresponding to the new flow. In some embodiments, the control circuitry updates a hardware flow counter table to include an entry corresponding to the new flow as described in FIG. 2. Once the hardware table is updated the hardware table records flow information related to the new flow entry. In some embodiments, the recorded flow information is transmitted to a network device as described above.

At step 614, control circuitry determines characteristic data related to the new flow entry. In some embodiments, characteristic data related to the new flow includes the activity of the flow, flow priority, and/or similar such characteristics. The activity of the flow may relate to how often the control circuitry forwards packets that correspond to the new flow. The activity of the flow may be determined by the control circuitry or may be predefined. In some embodiments, the activity of the flow is determined using attributes of the data packets associated with the flow. In some embodiments, a network administrator may define flows having data packets with particular attributes as having a certain priority level. For example, flows having data packet with a first source address may be defined as a higher priority than flows having data packets with a second source address.

At step 616, control circuitry determines if the new flow should be tracked using the software table and the hardware table based on the characteristic data determined in step 614. In some embodiments, control circuitry uses a third set of conditions associated with the characteristic data to determine if the new flow should be tracked using the software table and the hardware table. For example, if the characteristic data indicates that the new flow corresponds to data packets larger than a certain threshold (e.g., 2,000 bytes) a condition may indicate that the flow should be tracked using the hardware table. In some embodiments, the control circuitry uses the resource information retrieved in step 606 in combination with the characteristic data determined in step 614, to determine if the new flow should be tracked using the hardware table. The third set of one or more conditions may be default conditions, may be set by a network administrator, may be optimized over time using machine learning, etc. In some embodiments, some conditions may be weighted compared to other conditions. If, based on the characteristic data, the control circuitry determines that the new flow should be tracked using the software table and the hardware table the process continues to step 612. If, based on the characteristic data, the control circuitry determines that the new flow should not be tracked using the hardware table the process continues to step 618.

At step 618, control circuitry records flow information related to the new flow using only the software table. In some embodiment, the software table counts and parses data packets that correspond to the new flow entry and records the flow information in the software table. In some embodiments, the recorded flow information is transmitted to a network device as described above.

The processes 400, 500, and 600 described above are intended to be illustrative and not limiting. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method performed by a network device, the method comprising:
   receiving a data packet, the data packet being associated with a flow;
   in response to the flow being a new flow, determining whether or not to track the new flow using a hardware table in the network device based on characteristics related to the new flow and resource information related to the hardware table, wherein characteristics related to the new flow include an activity of the new flow that corresponds to a type of flow to be tracked using the hardware table, wherein the type of flow to be tracked includes flows that send a number of packets during a period of time that exceeds a threshold number of packets; and in response to a determination to track the new flow using the hardware table:
adding a table entry corresponding to the new flow to the hardware table, wherein flow information contained in received data packets corresponding to the new flow is recorded in the table entry corresponding to the new flow; and
updating a software table with flow information stored in the hardware table on a repeated basis.

2. The method of claim 1, wherein the resource information related to the hardware table includes a number of flows installed in the hardware table, wherein whether or not to track the new flow using a hardware table includes comparing the number of flows installed in the hardware table to a threshold value.

3. The method of claim 1, the method further comprising, in response to a determination to track the new flow using only the software table in the network device, recording the flow information related to the new flow only in the software table.

4. The method of claim 1, the method further comprising, in response to a determination to track the new flow using both the hardware table and the software table in the network device, recording the flow information in the hardware table and the software.

5. The method of claim 1, wherein the updating is performed periodically.

6. The method of claim 1, wherein the updating is performed in response to a threshold number of data packets corresponding to the new flow are counted.

7. The method of claim 1, wherein the flow information includes one or more of: a number of packets in the new flow, a number of bytes in the new flow, ingress and egress interface of the new flow, entry creation time of the table entry corresponding to the new flow, and last time of update of the new flow.

8. A network device comprising:
one or more computer processors; and
a computer-readable storage device comprising instructions that control the one or more computer processors to:
receive a data packet, the data packet being associated with a flow;
determine, in response to the flow being a new flow, whether or not to track the new flow using a hardware table in the network device based on characteristics related to the new flow and resource information related to the hardware table, wherein characteristics related to the new flow include an activity of the new flow that corresponds to a type of flow to be tracked using the hardware table, wherein the type of flow to be tracked includes flows that send a number of packets during a period of time that exceeds a threshold number of packets;
add, in response to a determination to track the new flow using the hardware table, a table entry corresponding to the new flow to the hardware table, wherein flow information contained in received data packets corresponding to the new flow is recorded in the table entry corresponding to the new flow; and
update, in response to the determination to track the new flow using the hardware table, a software table with flow information stored in the hardware table on a repeated basis.

9. The network device of claim 8, wherein the resource information related to the hardware table includes a number of flows installed in the hardware table, wherein whether or not to track the new flow using a hardware table includes comparing the number of flows installed in the hardware table to a threshold value.

10. The network device of claim 8, wherein the computer-readable storage device further comprises instructions that control the one or more computer processors to record, in response to a determination to track the new flow using only the software table in the network device, the flow information related to the new flow only in the software table.

11. The network device of claim 8, wherein the computer-readable storage device further comprises instructions that control the one or more computer processors to record, in response to a determination to track the new flow using both the hardware table and the software table in the network device, the flow information in the hardware table and the software table.

12. The network device of claim 8, wherein the updating is performed periodically.

13. The network device of claim 8, wherein the updating is performed in response to a threshold number of data packets corresponding to the new flow are counted.

14. The network device of claim 8, wherein the flow information includes one or more of: a number of packets in the new flow, a number of bytes in the new flow, ingress and egress interface of the new flow, entry creation time of the table entry corresponding to the new flow, and last time of update of the new flow.

15. A non-transitory computer-readable storage device in a network device, the non-transitory computer-readable storage device having stored thereon computer executable instructions, which when executed, cause the network device to:
receive a data packet, the data packet being associated with a flow;
determine, in response to the flow being a new flow, whether or not to track the new flow using a hardware table in the network device based on characteristics related to the new flow and resource information related to the hardware table, wherein characteristics related to the new flow include an activity of the new flow that corresponds to a type of flow to be tracked using the hardware table, wherein the type of flow to be tracked includes flows that send a number of packets during a period of time that exceeds a threshold number of packets;
add, in response to a determination to track the new flow using the hardware table, a table entry corresponding to the new flow to the hardware table, wherein flow information contained in received data packets corresponding to the new flow is recorded in the table entry corresponding to the new flow; and
update, in response to the determination to track the new flow using the hardware table, a software table with flow information stored in the hardware table on a repeated basis.

16. The non-transitory computer-readable storage device of claim 15, wherein the resource information related to the hardware table includes a number of flows installed in the hardware table, wherein whether or not to track the new flow using a hardware table includes comparing the number of flows installed in the hardware table to a threshold value.

17. The non-transitory computer-readable storage device of claim 15, wherein the computer executable instructions, which when executed, further cause the network device to record, in response to a determination to track the new flow using only the software table in the network device, the flow information related to the new flow only in the software table.

18. The non-transitory computer-readable storage device of claim 15, wherein the computer executable instructions, which when executed, further cause the network device to update, in response to a determination to track the new flow using both the hardware table and the software table in the network device, the flow information stored in the hardware table and the software table.

19. The non-transitory computer-readable storage device of claim 15, wherein the updating is performed periodically.

20. The non-transitory computer-readable storage device of claim 15, wherein the updating is performed in response to a threshold number of data packets corresponding to the new flow are counted.

\* \* \* \* \*